(12) United States Patent
Berard et al.

(10) Patent No.: US 6,875,820 B2
(45) Date of Patent: Apr. 5, 2005

(54) CHLORINATED POLYOLEFIN IMPACT MODIFIER FOR VINYL CHLORIDE POLYMERS

(75) Inventors: Mark Thomas Berard, Baton Rouge, LA (US); Virginia Hayes Guffey, Baton Rouge, LA (US); Gary Robert Marchand, Baton Rouge, LA (US)

(73) Assignee: DuPont Dow Elastomers LLC, Wilmington, DE (US)

( * ) Notice: Subject to any disclaimer, the term of this patent is extended or adjusted under 35 U.S.C. 154(b) by 0 days.

(21) Appl. No.: 10/221,228

(22) PCT Filed: Apr. 18, 2001

(86) PCT No.: PCT/US01/12579

§ 371 (c)(1),
(2), (4) Date: Sep. 9, 2002

(87) PCT Pub. No.: WO01/81463

PCT Pub. Date: Nov. 1, 2001

(65) Prior Publication Data

US 2004/0039119 A1 Feb. 26, 2004

Related U.S. Application Data

(60) Provisional application No. 60/198,558, filed on Apr. 20, 2000.

(51) Int. Cl.$^7$ .............................................. C08F 214/06

(52) U.S. Cl. ................. 525/331.5; 525/331.7; 525/331.9; 525/332.1; 525/356

(58) Field of Search .......................... 525/331.5, 331.7, 525/331.9, 332.1, 356

(56) References Cited

U.S. PATENT DOCUMENTS

| | | | |
|---|---|---|---|
| 3,006,889 A | | 10/1961 | Frey |
| 3,209,055 A | | 9/1965 | Hedberg et al. |
| 3,467,732 A | | 9/1969 | Schnebelen et al. |
| 3,907,934 A | * | 9/1975 | Dall'Asta et al. ........... 525/222 |
| 4,113,805 A | * | 9/1978 | Frey et al. .................. 525/239 |
| 4,280,940 A | * | 7/1981 | Klug et al. .................. 524/527 |
| 4,481,133 A | | 11/1984 | Gonzenbach et al. |
| 4,767,823 A | | 8/1988 | Jones et al. |
| 4,778,856 A | * | 10/1988 | Chen et al. .................. 525/190 |
| 5,087,669 A | * | 2/1992 | Prejean ....................... 525/239 |
| 6,124,406 A | * | 9/2000 | Cinadr et al. ............ 525/333.4 |
| 6,277,915 B1 | * | 8/2001 | Lepilleur et al. ............. 525/76 |

* cited by examiner

Primary Examiner—Samuel A. Acquah

(57) ABSTRACT

Chlorinated olefin polymers prepared from olefin polymer base resins having $I_{10}$ values of 0.05–0.8 dg/minute act as impact modifiers for vinyl chloride polymers under low to ambient temperature conditions. When vinyl chloride polymers are mixed with a preferred class of the chlorinated polymers, having chlorine contents of 20–30 percent by weight, compositions that exhibit short fusion times and low fusion temperatures are produced.

8 Claims, No Drawings

CHLORINATED POLYOLEFIN IMPACT MODIFIER FOR VINYL CHLORIDE POLYMERS

This application claims the benefit of Provisional Application No. 60/198,558 filed Apr. 20, 2000.

FIELD OF THE INVENTION

This invention relates to improved impact-resistant vinyl chloride polymer compositions. More specifically, this invention relates to blends of chlorinated polyolefin impact modifiers and vinyl chloride polymers, especially polyvinylchloride.

BACKGROUND OF THE INVENTION

Polyvinyl chloride (PVC) is widely used in both its rigid and flexible forms in such applications as films, siding, sheets, pipe and tubing. Because rigid PVC is a hard, brittle thermoplastic polymer, it is often mixed with a modifier to form a composition that is less prone to failure on impact. For example, in U.S. Pat. Nos. 3,006,889 and 3,209,055 the use of a broad range of chlorinated and chlorosulfonated polyethylenes in blends with PVC is disclosed. In addition, various types of specialty chlorinated polyethylenes have been used as impact modifiers. For example, chlorinated polyethylenes having low blocking tendencies that are prepared from polyolefins having melt indexes ($I_2$) of 0.3 dg/minute and 0.2 dg/minute are disclosed as impact modifiers for PVC in U.S. Pat. No. 4,767,823. Further, impact modifiers that are mixtures of chlorinated polyethylenes with other polymers have been disclosed. As an example, Aono et al., in Japanese Unexamined Patent Application Hei 7-11085, disclose the use of a mixture of a chlorinated polyethylene prepared from a polyethylene of molecular weight 50,000 to 400,000 and AES resin (acrylonitrile-EPDM-styrene), optionally in combination with other polymers, as an impact modifier for PVC.

Despite the extensive prior art that exists related to chlorinated polyethylene impact modification of PVC, economical compositions that exhibit exceptionally good impact strengths in the ambient to low temperature range have not been disclosed. Such compositions would be useful in applications such as siding, profiles and pipe.

Impact strength is not the only physical property of PVC that can be improved by addition of chlorinated polymeric additives. For example, in U.S. Pat. No. 4,481,133 a method for improving extrudability of PVC/chlorinated polyethylene blends is disclosed that involves mixing PVC with chlorinated polyethylene of molecular weight 10,000 to 12,000,000 (preferably 60,000 to 500,000), and a fluoropolymer. The benefits of blending PVC with more than one type of chlorinated polyethylene are disclosed by Klug, et al. in U.S. Pat. No. 4,280,940. The Klug reference discloses an easily processed blend of PVC and two chlorinated polyethylenes, where the first chlorinated polyethylene is prepared from polyethylene having a melt flow index 190/5 (i.e. $I_5$ at 190° C.) of preferably 0.3–3.5 g/10 minutes (0.3–3.5 dg/minute) and the second chlorinated polyethylene is prepared from polyethylene having a melt flow index 190/5 preferably of from 40–55 g/10 minutes (40–55 dg/minute).

With regard to PVC compositions useful in the ambient to low temperature range, it would be desirable to have a composition that is characterized by excellent impact resistance in combination with ease of preparation. Efficient manufacture of PVC/additive compositions requires that the blends exhibit an appropriately low fusion temperature and fusion time. Fusion temperature refers to the temperature at which a mixture of PVC and an additive form a homogeneous system. In order to incorporate an additive into PVC, it is necessary to heat the PVC while blending in the additive. Short fusion times and low temperatures are desirable because PVC is susceptible to decomposition at melt temperatures. An impact modifier that has a low fusion temperature and short fusion time would consequently have definite processing advantages in manufacture of PVC compositions.

SUMMARY OF THE INVENTION

The present invention is specifically directed to an improved vinyl chloride composition having excellent impact strength. In particular, the impact resistant composition comprises a) a vinyl chloride polymer and b) an impact modifier, wherein said impact modifier comprises a polymer consisting of a chlorinated olefin polymer having a chlorine content of from 15–39 percent by weight; said chlorinated olefin polymer being prepared from an olefin polymer selected from the group consisting of i) polyethylene homopolymers having $I_{10}$ values of from 0.05–0.8 dg/minute and ii) copolymers of ethylene and up to 10 mole percent of a copolymerizable monomer, said copolymers having $I_{10}$ values of from 0.05–0.8 dg/minute; and wherein no more than 1 weight percent of a chlorinated olefin polymer having a weight average molecular weight below 200,000 daltons is present in the impact resistant composition.

In a preferred embodiment, the chlorinated olefin polymer has a chlorine content of 20 to 30 percent by weight. Such compositions exhibit low fusion temperatures and short fusion times.

DETAILED DESCRIPTION OF THE INVENTION

The impact resistant compositions of the present invention comprise a vinyl chloride polymer and a chlorinated olefin polymer having specific chemical composition and physical properties.

The vinyl chloride polymer component is a solid, high molecular weight polymer that may be a polyvinyl chloride homopolymer or a copolymer of vinyl chloride having copolymerized units of one or more additional comonomers. When present, such comonomers will account for up to 20 weight percent of the copolymer, preferably from 1–5 weight percent of the copolymer. Examples of suitable comonomers include $C_2$–$C_{10}$ olefins, for example ethylene and propylene; vinyl esters of straight chain or branched $C_2$–$C_4$ carboxylic acids, such as vinyl acetate, vinyl propionate, and vinyl 2-ethyl hexanoate; vinyl halides, for example vinyl fluoride, vinylidene fluoride or vinylidene chloride; vinyl ethers, such as vinyl methyl ether and butyl vinyl ether; vinyl pyridine; unsaturated acids, for example maleic acid, fumaric acid, methacrylic acid and their mono- or diesters with $C_1$–$C_{10}$ mono- or dialcohols; maleic anhydride, maleic acid imide as well as the N-substitution products of maleic acid imide with aromatic, cycloaliphatic and optionally branched aliphatic substituents; acrylonitrile and styrene. Such homopolymers and interpolymerized copolymers are commercially available from Borden Chemicals and Plastics. They may also be prepared by any suitable polymerization method. Polymers prepared using a suspension process are preferred.

Graft copolymers of vinyl chloride are also suitable for use in the invention. For example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride may be used as the vinyl chloride polymer component. A commercially available example of such a polymer is Vinnol® 550, available from Wacker Chemie GmbH.

The chlorinated olefin polymer component of the compositions of the invention is selected from the group consisting of a) chlorinated polyethylene homopolymers prepared from polyethylenes having an $I_{10}$ value of from 0.05–0.8 dg/minute and b) chlorinated copolymers prepared from polyolefins having an $I_{10}$ value of from 0.05–0.8 dg/minute that contain copolymerized units of i) ethylene and ii) up to 10 mole percent of a copolymerizable monomer. The chlorinated olefin polymer may optionally contain chlorosulfonyl groups. That is, the polymer chain will have pendant chlorine groups and chlorosulfonyl groups. Such polymers are known as chlorosulfonated olefin polymers.

Representative chlorinated and chlorosulfonated olefin polymers include a) chlorinated and chlorosulfonated homopolymers of ethylene and b) chlorinated and chlorosulfonated copolymers of ethylene and at least one ethylenically unsaturated monomer selected from the group consisting of $C_3$–$C_{10}$ alpha monoolefins; $C_1$–$C_{12}$ alkyl esters of $C_3$–$C_{20}$ monocarboxylic acids; unsaturated $C_3$–$C_{20}$ mono- or dicarboxylic acids; anhydrides of unsaturated $C_4$–$C_8$ dicarboxylic acids; and vinyl esters of saturated $C_2$–$C_{18}$, carboxylic acids. Chlorinated and chlorosulfonated graft copolymers are included as well. Specific examples of suitable polymers include chlorinated polyethylene; chlorosulfonated polyethylene; chlorinated ethylene vinyl acetate copolymers; chlorosulfonated ethylene vinyl acetate copolymers; chlorinated ethylene acrylic acid copolymers; chlorosulfonated ethylene acrylic acid copolymers; chlorinated ethylene methacrylic acid copolymers; chlorosulfonated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; chlorinated copolymers of ethylene with propylene, butene, 3-methyl-1-pentene, or octene and chlorosulfonated copolymers of ethylene with propylene, butene, 3-methyl-1-pentene or octene. The copolymers may be dipolymers, terpolymers, or higher order copolymers. Preferred chlorinated olefin polymers are-chlorinated polyethylene and chlorinated copolymers of ethylene vinyl acetate.

A particular feature of the chlorinated olefin polymers of the present invention is that they are prepared from polyolefin base resins having relatively high molecular weights. That is, the polyolefin base resins are characterized by having $I_{10}$ melt index values of from 0.05 dg/minute to 0.8 dg/minute, preferably from 0.3–0.8 dg/minute, most preferably from 0.5–0.8 dg/minute. $I_{10}$ melt indices within the broad range of 0.05–0.8 dg/minute correspond generally to weight average molecular weights of 400,000–1,000,000 daltons. Olefin polymers having $I_{10}$ melt indices below 0.05 are difficult to manufacture. Olefin polymers having $I_{10}$ melt indices above 0.8 dg/minute are inferior in impact performance.

The chlorinated and chlorosulfonated olefin polymers useful in the practice of the invention contain 15–39 weight percent chlorine, preferably 20–30 weight percent chlorine. Because the molecular weight of the non-chlorinated polyolefin base resins is from approximately 400,000–1,000,000 daltons, the chlorinated and chlorosulfonated olefin polymers will be of relatively high molecular weight. If the chlorinated olefin polymer is chlorosulfonated, it will generally have a sulfur content of up to 6 wt. %, preferably 1–3 wt. %. It is a further feature of the invention that the impact resistant compositions contain less than 1 wt. %, based on the weight of the chlorinated olefin polymer, of a chlorinated olefin polymer of low molecular weight, i.e. having a weight average molecular weight below 200,000 daltons.

The chlorinated olefin polymers and chlorosulfonated olefin polymers suitable for use in the impact resistant compositions of the invention may be prepared from polyolefin resins that are branched or unbranched. The polyolefin base resins may be prepared by free radical processes, Ziegler-Natta catalysis or catalysis with metallocene catalyst systems, for example those disclosed in U.S. Pat. Nos. 5,272,236 and 5,278,272. Chlorination or chlorosulfonation of the base resins may take place in suspension, solution, solid state or fluidized bed. Free radical suspension chlorination processes are described and taught in U.S. Pat. Nos. 3,454,544, 4,767,823 and references cited therein. Such processes involve preparation of an aqueous suspension of a finely divided ethylene polymer which is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823. Chlorosulfonation processes are generally performed in solution but suspension and non-solvent processes are also known. Preparation of chlorosulfonated olefin polymers is described in U.S. Pat. Nos. 2,586,363; 3,296,222; 3,299,014; and 5,242,987.

The impact resistant compositions of the invention will generally comprise 2–20 parts by weight of the chlorinated or chlorosulfonated olefin polymer per 100 parts by weight of vinyl chloride polymer. Preferably, 2–15 parts by weight (and most preferably 2–8 parts by weight) of the chlorinated or chlorosulfonated olefin polymer per 100 parts by weight of the vinyl chloride polymer is used because this level provides compositions having a good combination of impact modification and stiffness. Compositions containing more than 20 parts by weight of the chlorinated or chlorosulfonated polymer are characterized by low modulus, resulting in poor dimensional stability.

The impact resistant compositions of the present invention are physical blends of polymers and do not require crosslinking or vulcanization in order to be useful as commercial products. However, the compositions can additionally contain compounding ingredients such as stabilizers, blowing agents, lubricants, colorants, fillers, crosslinking agents, process aids and the like. The use of such additional components permits the compositions to be tailored for use in various applications, for example rigid PVC profiles such as siding, windows, fencing, decking and pipe. Particularly useful compounding ingredients include tin stabilizers, calcium carbonate, titanium dioxide, acrylic process aids, and hydrocarbon and ester waxes. If compounding ingredients are utilized, they are generally used in amounts of from 0.1–30 parts per 100 parts vinyl chloride resin, depending on the type of additive. For example, fillers are generally used in amounts of 2–25 parts per 100 parts vinyl chloride polymer.

In a preferred embodiment, the chlorine content of the chlorinated olefin polymer ranges from 20 to 30 percent by weight. Such compositions exhibit a particularly favorable combination of low fusion temperature and short fusion time. That is, when such polymers are blended with vinyl chloride polymers, generally by a process that involves feeding the polymeric components as powders to an extruder and processing at melt temperatures of 160° C.–220° C., a homogenous mixture will be formed within approximately five minutes. When chlorinated polymers of the invention having chlorine contents of 20–30 wt. % are utilized as blend components, extrusion temperatures can be maintained at the lower end of this range, i.e. generally from 160° C.–200° C. This results in little or no polymer degradation and rapid production of the impact resistant compositions of the invention.

The impact-resistant compositions of this invention may further comprise one or more additional polymers (such as acrylonitrile or acrylate polymers) to provide a preferred composition. Examples of such polymers include, but are not limited to acrylonitrile butadiene styrene copolymers (ABS), available from Rohm and Haas Co.; and methacrylate butadiene styrene copolymers (MBS); polyacrylates, such as Paraloid™ KM-334 acrylic impact modifier (available from Rohm and Haas Company) and modified acrylic polymers, such as Durastrength® 200 acrylic impact modifier (available from ATOFINA). The additional polymer component or components are preferably present in amounts of no more than 200 parts per 100 parts of chlorinated olefin polymer. Impact resistant compositions of the invention that contain the additional polymeric component typically contain between 1 to 20 parts by weight of the additional component per 100 parts by weight of vinyl chloride polymer.

The impact resistant compositions of the present invention are particularly useful in the manufacture of PVC siding and window profiles.

The invention is further illustrated by the following embodiments wherein all parts are by weight unless otherwise indicated.

EXAMPLES

Example 1

A PVC masterbatch composition, Masterbatch A, was prepared in a Welex high intensity mixer according to the following procedure: 100 parts PVC was added to the mixer and the contents were mixed and heated until the temperature reached 120° F. (49° C.). One part of Advastab® TM-281, a tin stabilizer available from Rohm and Haas Company, was then added and mixing was continued. When a temperature of 165° F. (74° C.) was reached 1 part of calcium stearate was-added. This was followed by addition of 1 part of TiPure® R960 titanium dioxide (available from E. I. du Pont de Nemours and Co.) and 15 parts Omyacarb® UFT calcium carbonate (available from Omya, Inc.) when the temperature reached 190° F. (88° C.). Mixing was continued until a temperature of 225° F. (107° C.) was reached. The speed of the mixer was then lowered to the minimum and the mixer was cooled externally. When the temperature of the mixture reached 120° F. (49° C.), it was removed. Approximately 6000 g of masterbatch was collected.

A chlorinated polyethylene, CPE-1, having a chlorine content of 34.6 wt. % and a heat of fusion (an indicator of residual crystallinity) of 0.14 cal/g was prepared in a slurry process from a polyethylene having a melt index ($I_{10}$) of 0.6 dg/minute, substantially according to the procedure described in U.S. Pat. No. 4,767,823 and references cited therein.

A composition of the invention, Sample 1-1, was prepared by mixing 118 parts of Masterbatch A; 4 parts of CPE-1; 1.2 parts of Hostalub® XL 165 paraffin wax (available from Clariant Corporation); and 0.2 parts A-C® 316 oxidized polyethylene (available from Honeywell International, Inc.) in a stainless steel blender for one minute. A 67 g sample of the resultant blended mixture was placed in a Haake Rheocord® 90 torque rheometer set at 60 rpm and a 1800° C. bowl temperature. Mixing continued until a totalized torque value (i.e. the integrated area under the torque vs. time curve) of 10 meter-kg-minute was reached. The bowl was then removed and the sample was collected. The total sample was pressed in a PHI hydraulic press using a 125 mil thick chase at 374° F. (1900° C.). The sample was preheated for 5 minutes, pressed for 5 minutes at 20 tons pressure, and then cooled under 20 tons pressure. Rectangular notched Izod test specimens were die cut from the compression molded plaque. The specimens were notched with a TMI notching cutter and the thickness of each specimen was measured at the point of the notch. The test specimens were then broken using a Tinius Olsen Plastics Impact Tester at room temperature and the impact strength calculated. Six test specimens were broken and the impact strength was taken as the average. Test specimens that failed in a ductile manner were noted and the number that failed in this manner was recorded. Results are shown in Table I. Eight other samples of the invention, Samples 1-2 through 1-9, were prepared substantially as described above except that the amounts of CPE-1 and paraffin wax were varied as shown in Table I.

The results show that 89% of the samples tested for Izod impact at room temperature exhibited ductile failure, rather than brittle break.

TABLE I

| Formulation | Sample 1-1 | Sample 1-2 | Sample 1-3 | Sample 1-4 | Sample 1-5 | Sample 1-6 | Sample 1-7 | Sample 1-8 | Sample 1-9 |
|---|---|---|---|---|---|---|---|---|---|
| Masterbatch A | 118 | 118 | 118 | 118 | 118 | 118 | 118 | 118 | 118 |
| CPE-1 | 4.0 | 4.5 | 5.0 | 4.0 | 4.5 | 5.0 | 4.0 | 4.5 | 5.0 |
| Paraffin Wax | 1.2 | 1.2 | 1.2 | 1.4 | 1.4 | 1.4 | 1.6 | 1.6 | 1.6 |
| Oxidized PE | 0.2 | 0.2 | 0.2 | 0.2 | 0.2 | 0.2 | 0.2 | 0.2 | 0.2 |
| Notched Izod Ductile Failures | 3/6 | 5/6 | 5/6 | 5/6 | 6/6 | 6/6 | 6/6 | 6/6 | 6/6 |

Example 2

A chlorinated polyethylene, CPE-2, having a chlorine content of 36.1 wt. % and a heat of fusion of 0.27 cal/g, was prepared in a slurry process from a polyethylene having a melt index ($I_{10}$) of 0.1 dg/minute, substantially according to the procedure described in U.S. Pat. No. 4,767,823 and references cited therein. A composition of the invention, Sample 2-1, was prepared substantially as described in Example 1 by mixing 118 parts of Masterbatch A; 4 parts of CPE-2; 1.2 parts of Hostalub® XL 165 paraffin wax (available from Clariant Corporation); and 0.2 parts A-C® 316 oxidized polyethylene (available from Honeywell International, Inc.). Notched Izod test specimens were prepared as described in Example 1. Six test specimens were broken and the impact strength was taken as the average. Test specimens that failed in a ductile manner were noted and the number that failed in this manner were recorded. Results are shown in Table II. Eight other samples of the invention, Samples 2-2 through 2-9, were prepared in substantially the same manner except that the amounts of CPE-2 and paraffin wax were varied as shown in Table II.

The results show that 96% of the samples tested for Izod impact at room temperature exhibited ductile failure, rather than brittle break.

Comparative Example B

A chlorinated polyethylene, CPE-4, having a chlorine content of 36.1 wt. % and a heat of fusion of 0.18 cal/g was prepared in a slurry process from a polyethylene having a melt index ($I_{10}$) of 1.45 dg/minute, substantially according to the procedure described in U.S. Pat. No. 4,767,823 and references cited therein. Comparative Sample B-1 was prepared substantially as described in Example 1 by mixing 118 parts of Masterbatch A; 4 parts of CPE-4; 1.2 parts of Hostalub® XL 165 paraffin wax (available from Clariant Corporation); and 0.2 parts A-C® 316 oxidized polyethylene (available from Honeywell International, Inc.). Notched Izod test specimens were prepared as described in Example 1. Six test specimens were broken and the impact strength

TABLE II

| Formulation | Sample 2-1 | Sample 2-2 | Sample 2-3 | Sample 2-4 | Sample 2-5 | Sample 2-6 | Sample 2-7 | Sample 2-8 | Sample 2-9 |
|---|---|---|---|---|---|---|---|---|---|
| Masterbatch A | 118 | 118 | 118 | 118 | 118 | 118 | 118 | 118 | 118 |
| CPE-2 | 4.0 | 4.5 | 5.0 | 4.0 | 4.5 | 5.0 | 4.0 | 4.5 | 5.0 |
| Paraffin Wax | 1.2 | 1.2 | 1.2 | 1.4 | 1.4 | 1.4 | 1.6 | 1.6 | 1.6 |
| Oxidized PE | 0.2 | 0.2 | 0.2 | 0.2 | 0.2 | 0.2 | 0.2 | 0.2 | 0.2 |
| Notched Izod Ductile Failures | 6/6 | 6/6 | 6/6 | 6/6 | 5/6 | 6/6 | 6/6 | 5/6 | 6/6 |

Comparative Example A

A chlorinated polyethylene, CPE-3, having a chlorine content of 36 wt. % and a heat of fusion of less than 0.2 cal/g was prepared in a slurry process from a polyethylene having a melt index ($I_{10}$) of 3.13 dg/minute, substantially according to the procedure described in U.S. Pat. No. 4,767,823 and references cited therein. Comparative Sample A-1 was prepared substantially as described in Example 1 by mixing 118 parts of Masterbatch A; 4 parts of CPE-3; 1.2 parts of Hostalub® XL 165 paraffin wax (available from Clariant Corporation); and 0.2 parts A-C® 316 oxidized polyethylene (available from Honeywell International, Inc.). Notched Izod test specimens were prepared as described in Example 1. Six test specimens were broken and the impact strength was taken as the average. Test specimens that failed in a ductile manner were noted and the number that failed in this manner were recorded. Results are shown in Table III. Eight other comparative samples Samples A-2 through A-9, were prepared in substantially the same manner except that the amounts of CPE-3 and paraffin wax were varied as shown in Table III.

The results show that 59% of the samples tested for Izod impact at room temperature exhibited ductile failure, rather than brittle break.

was taken as the average. Test specimens that failed in a ductile manner were noted and the number that failed in this manner were recorded. Results are shown in Table IV. Eight other comparative samples Samples B-2 through B-9, were prepared in substantially the same manner except that the amounts of CPE-4 and paraffin wax were varied as shown in Table IV.

The results show that 76% of the samples tested for Izod impact at room temperature exhibited ductile failure, rather than brittle break.

TABLE III

| Formulation | Sample A-1 | Sample A-2 | Sample A-3 | Sample A-4 | Sample A-5 | Sample A-6 | Sample A-7 | Sample A-8 | Sample A-9 |
|---|---|---|---|---|---|---|---|---|---|
| Masterbatch A | 118 | 118 | 118 | 118 | 118 | 118 | 118 | 118 | 118 |
| CPE-3 | 4.0 | 4.5 | 5.0 | 4.0 | 4.5 | 5.0 | 4.0 | 4.5 | 5.0 |
| Paraffin Wax | 1.2 | 1.2 | 1.2 | 1.4 | 1.4 | 1.4 | 1.6 | 1.6 | 1.6 |
| Oxidized PE | 0.2 | 0.2 | 0.2 | 0.2 | 0.2 | 0.2 | 0.2 | 0.2 | 0.2 |
| Notched Izod Ductile Failures | 1/6 | 2/6 | 3/6 | 2/6 | 6/6 | 4/6 | 4/6 | 6/6 | 4/6 |

TABLE IV

| Formulation | Sample B-1 | Sample B-2 | Sample B-3 | Sample B-4 | Sample B-5 | Sample B-6 | Sample B-7 | Sample B-8 | Sample B-9 |
|---|---|---|---|---|---|---|---|---|---|
| Masterbatch A | 118 | 118 | 118 | 118 | 118 | 118 | 118 | 118 | 118 |
| CPE-4 | 4.0 | 4.5 | 5.0 | 4.0 | 4.5 | 5.0 | 4.0 | 4.5 | 5.0 |
| Paraffin Wax | 1.2 | 1.2 | 1.2 | 1.4 | 1.4 | 1.4 | 1.6 | 1.6 | 1.6 |
| Oxidized PE | 0.2 | 0.2 | 0.2 | 0.2 | 0.2 | 0.2 | 0.2 | 0.2 | 0.2 |
| Notched Izod Ductile Failures | 4/6 | 5/6 | 4/6 | 3/6 | 3/6 | 5/6 | 6/6 | 6/6 | 5/6 |

Example 3

A PVC masterbatch composition, Masterbatch B, was prepared in a Welex high intensity mixer according to the following procedure: 100 parts PVC was added to the mixer and the contents were heated until the temperature reached 120° F. (49° C). 1.5 parts of Thermolite®-137, a tin stabilizer available from Elf Atochem North America, Inc. was then added and blending was continued until a temperature of 165° F. (74° C.) was reached, at which point 0.92 parts calcium stearate, 1 part Hostlube® XL-165 paraffin wax (available from Clariant Corp.), and 1 part Paraloid™ K120N acrylic process aid (available from Rohm and Haas Co.) were added. When the temperature reached 190° F. (88° C.), 10 parts of TiPure® R960 titanium dioxide (available from E. I. du Pont de Nemours and Co.) and 5 parts omyacarb® UFT calcium carbonate (available from Omya, Inc.) were added. Blending was continued until a temperature of 225° F. (107° C.) was reached. The speed of the mixer was lowered to the minimum and the mixer was cooled externally. When the temperature of the mixture reached 120° F. (49° C.), it was removed and approximately 6000 g of masterbatch was collected.

A chlorinated polyethylene, CPE-5, having a chlorine content of 20.3 wt. % and a heat of fusion of 2.71 cal/g was prepared in a slurry process from a polyethylene having a melt index ($I_{10}$) of 0.30 dg/minute, substantially according to the procedure described in U.S. Pat. No. 4,767,823 and references cited therein. A composition of the invention, Sample 3, was prepared substantially as described in Example 1 by mixing 119.42 parts of Masterbatch B and 5 parts of CPE-5. Notched Izod test specimens were prepared as described in Example 1. Eight test specimens were broken in tests at both 0° C. and at room temperature and the impact strength was taken as the average. Sample 3 exhibited an exceptionally good combination of room temperature and low temperature Izod impact strength along with a rapid fusion rate. The average room temperature Izod test value for Sample 3 was 22 ft·lb/in (1.17 kJ/m) with 100% ductile failure. The average 0° C. Izod test value was 2.9 ft·lb/in (0.15 kJ/m). Fusion time was 48 seconds for CPE-5.

Comparative Example C

A chlorinated polyethylene, CPE-6, having a chlorine content of 26.1 wt. % and a heat of fusion of 0.26 cal/g was prepared in a slurry process from a polyethylene having a melt index ($I_{10}$) of 1.13 dg/minute, substantially according to the procedure described in U.S. Pat. No. 4,767,823 and references cited therein. Comparative Sample C was prepared substantially as described in Example 3 by mixing 119.42 parts of Masterbatch B and 5 parts of CPE-6. Notched Izod test specimens were prepared as described in Example 1. Eight test specimens were broken in tests at both 0° C. and at room temperature and the impact strength was taken as the average. Comparative Sample C did not exhibit a good combination of impact strength and fusion time. The average room temperature Izod test value for Comparative Sample C was 23 ft·lb/in (1.23 kJ/m) with 100% ductile failure. The average 0° C. Izod test value was 2.8 ft·lb/in (0.15 kJ/m). Fusion time was 66 seconds for CPE-6.

Comparative Example D

A chlorinated polyethylene, CPE-7, having a chlorine content of 25.5 wt. % and a heat of fusion of 0.18 cal/g was prepared in a slurry process from a polyethylene having a, melt index ($I_{10}$) of 2.45 dg/minute, substantially according to the procedure described in U.S. Pat. No. 4,767,823 and references cited therein. Comparative Sample D was prepared substantially as described in Example 3 by mixing 119.42 parts of Masterbatch B and 5 parts of CPE-7. Notched Izod test specimens were prepared as described in Example 1. Eight test specimens were broken in tests at both 0° C. and at room temperature and the impact strength was taken as the average. The average room temperature Izod test value for Comparative Sample D was 9.6 ft·lb/in (0.52 kJ/m) with 25% ductile failure. The average 0° C. Izod test value was 2.7 ft·lb/in (0.14 kJ/m). Fusion time was 48 seconds for CPE-7.

Comparative Example E

A chlorinated polyethylene, CPE-8, having a chlorine content of 35.5 wt. % and a heat of fusion of 0.17 cal/g was prepared in a slurry process from a polyethylene having a melt index ($I_{10}$) of 2.45 dg/minute, substantially according to the procedure described in U.S. Pat. No. 4,767,823 and references cited therein. Comparative Sample E was prepared substantially as described in Example 3 by mixing 119.42 parts of Masterbatch B and 5 parts of CPE-8. Notched Izod test specimens were prepared as described in Example 1. Eight test specimens were broken in tests at both 0° C. and at room temperature and the impact strength was taken as the average. The average room temperature Izod test value for Comparative Sample E was 24 ft·lb/in (1.28 kJ/m) with 100% ductile failure. The average 0° C. Izod test value was 2.3 ft·lb/in (0.12 kJ/m). Fusion time was 102 seconds for CPE-8.

What is claimed is:

1. An impact-resistant composition consisting essentially of a) a vinyl chloride polymer; b) 2–15 parts by weight of an impact modifier per 100 parts by weight vinyl chloride polymer, said impact modifier consisting of a randomly chlorinated olefin polymer having a chlorine content of from 15–39 percent by weight; said randomly chlorinated olefin polymer being prepared from an olefin polymer selected from the group consisting of i) polyethylene homopolymers having $I_{10}$ values of from 0.05–0.8 dg/minute and ii) copolymers of ethylene and up to 10 mole percent of a copolymerizable monomer, said copolymers having $I_{10}$ values of from 0.05–0.8 dg/minute; and wherein no more than 1 weight percent of a randomly chlorinated olefin polymer having a weight average molecular weight below 200,000 Daltons is present in the impact resistant composition; and c) 0 to 200 parts by weight of an additional polymeric component per 100 parts by weight of said impact modifier, wherein said additional polymeric component is selected from the group consisting of acrylonitrile butadiene styrene copolymers and acrylate polymers.

2. An impact-resistant composition of claim 1 wherein the chlorinated olefin polymer has a chlorine content of from 20–30 percent by weight.

3. An impact-resistant composition of claim 1 wherein the chlorinated olefin polymer is prepared from a polyethylene homopolymer having an $I_{10}$ value of from 0.05–0.8 dg/minute.

4. An impact-resistant composition of claim 1 wherein the chlorinated olefin polymer is prepared from an olefin polymer comprising copolymerized units of ethylene and up to 10 mole percent of at least one ethylenically unsaturated monomer selected from the group consisting of i) $C_3$–$C_{10}$ alpha monoolefins; ii) $C_1$–$C_{12}$ alkyl esters of $C_3$–$C_{20}$ monocarboxylic acids; iii) unsaturated $C_3$–$C_{20}$ mono- or dicarboxylic acids; iv) anhydrides of unsaturated $C_4$–$C_8$ dicarboxylic acids; and v) vinyl esters of saturated $C_2$–$C_{18}$ carboxylic acids.

5. An impact-resistant composition of claim 4 wherein the unsaturated monomer is selected from the group consisting of propylene; butene; 3-methyl-1-pentene; octene; vinyl acetate; acrylic acid; methacrylic acid; methyl acrylate; methyl methacrylate; and glycidyl methacrylate.

6. An impact-resistant composition of any one of claims 2 to 5 or 12 wherein the chlorinated olefin polymer is a chlorosulfonated olefin polymer.

7. An impact-resistant composition of claim 1 wherein the vinyl chloride polymer is selected from the group consisting of i) a polyvinyl chloride homopolymer, ii) an interpolymerized copolymer comprising units of vinyl chloride and up to 20 weight percent units of at least one additional comonomer, and iii) a graft copolymer of vinyl chloride grafted to an ethylene-containing polymer.

8. An impact-resistant composition of claim 1 wherein said acrylate polymer is selected from the group consisting of methacrylate butadiene styrene copolymers and polyacrylates.

* * * * *